(12) United States Patent
Zhou et al.

(10) Patent No.: US 9,678,277 B2
(45) Date of Patent: Jun. 13, 2017

(54) FILTER, METHOD FOR PRODUCING FILTER, AND LASER WAVELENGTH MONITORING APPARATUS

(71) Applicant: Huawei Technologies Co., Ltd., Shenzhen (CN)

(72) Inventors: Min Zhou, Shenzhen (CN); Lei Wang, Shenzhen (CN); Huafeng Lin, Shenzhen (CN); Zhenxing Liao, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/952,688

(22) Filed: Nov. 25, 2015

(65) Prior Publication Data

US 2016/0085028 A1 Mar. 24, 2016

Related U.S. Application Data

(63) Continuation of application No. PCT/CN2013/076273, filed on May 27, 2013.

(51) Int. Cl.
| | |
|---|---|
| *H04B 10/00* | (2013.01) |
| *G02B 6/293* | (2006.01) |
| *C23C 18/16* | (2006.01) |
| *G02B 27/14* | (2006.01) |
| *G02B 27/30* | (2006.01) |
| *H04B 10/079* | (2013.01) |
| *H04B 10/25* | (2013.01) |

(Continued)

(52) U.S. Cl.
CPC ...... *G02B 6/29361* (2013.01); *C23C 18/1633* (2013.01); *G02B 6/4215* (2013.01); *G02B 27/141* (2013.01); *G02B 27/30* (2013.01); *H04B 10/07957* (2013.01); *H04B 10/2504* (2013.01); *G02B 1/11* (2013.01); *G02B 6/4286* (2013.01)

(58) Field of Classification Search
USPC .............. 398/79–88, 135–139, 202, 212
See application file for complete search history.

(56) References Cited

U.S. PATENT DOCUMENTS

| | | | |
|---|---|---|---|
| 4,074,930 A * | 2/1978 | Folsom | ........... G02B 23/12 359/276 |
| 4,415,233 A | 11/1983 | Itoh et al. | |

(Continued)

FOREIGN PATENT DOCUMENTS

| | | |
|---|---|---|
| CN | 2583691 Y | 10/2003 |
| CN | 101726872 A | 6/2010 |

(Continued)

*Primary Examiner* — Agustin Bello
(74) *Attorney, Agent, or Firm* — Slater Matsil, LLP

(57) ABSTRACT

A filter includes two translucent bodies. Each of the translucent bodies has a first plane, a second plane that forms a wedge angle with the first plane, and a third plane that intersects with both the first plane and the second plane, first planes of the two translucent bodies are parallel to each other, and second planes of the two translucent bodies are parallel to each other. The filter also comprises a beam splitting film, where surfaces of both sides are respectively combined with the first planes of the two translucent bodies. Two reflective films are combined, respectively, with the second planes of the two translucent bodies.

10 Claims, 5 Drawing Sheets

(51) Int. Cl.
*G02B 6/42* (2006.01)
*G02B 1/11* (2015.01)

(56) References Cited

U.S. PATENT DOCUMENTS

| | | | | |
|---|---|---|---|---|
| 4,431,258 A * | 2/1984 | Fye | G02B 6/29349 | 359/589 |
| 4,627,688 A * | 12/1986 | Kobayashi | G02B 27/142 | 359/589 |
| 4,726,012 A * | 2/1988 | Amadieu | G02B 6/2938 | 385/24 |
| 4,733,926 A * | 3/1988 | Title | G02B 27/283 | 359/352 |
| 4,844,584 A * | 7/1989 | Miyagawa | G02B 6/4218 | 359/489.09 |
| 4,859,029 A * | 8/1989 | Durell | G02B 5/3066 | 359/629 |
| 5,040,863 A * | 8/1991 | Kawakami | G02F 1/093 | 264/1.31 |
| 5,077,723 A * | 12/1991 | Yoshimatsu | G11B 7/08 | 369/110.02 |
| 5,164,857 A * | 11/1992 | Lin | G02B 27/1006 | 359/350 |
| 5,309,422 A * | 5/1994 | Kuroki | G11B 7/1365 | 359/485.02 |
| 5,400,179 A | 3/1995 | Ito | | |
| 5,457,558 A * | 10/1995 | Yokoyama | G02B 6/2938 | 359/634 |
| 5,611,006 A * | 3/1997 | Tabuchi | G02B 6/4204 | 257/432 |
| 5,748,369 A * | 5/1998 | Yokota | G02B 27/283 | 349/9 |
| 5,790,306 A * | 8/1998 | Kleinberg | G02B 27/108 | 359/368 |
| 5,883,730 A * | 3/1999 | Coult | G02B 6/4246 | 398/129 |
| 6,097,521 A * | 8/2000 | Althaus | G02B 6/4246 | 359/618 |
| 6,212,014 B1 * | 4/2001 | Lehman, Jr. | G02B 27/283 | 359/489.09 |
| 6,320,993 B1 * | 11/2001 | Laor | G02B 6/262 | 385/16 |
| 6,334,716 B1 * | 1/2002 | Ojima | H04B 10/40 | 385/88 |
| 6,386,710 B2 * | 5/2002 | Kusano | H04N 5/7441 | 348/E5.141 |
| 6,421,176 B1 * | 7/2002 | Takahashi | G02B 5/305 | 359/281 |
| 6,480,636 B1 * | 11/2002 | Satoh | G02F 1/093 | 359/484.03 |
| 6,487,014 B2 * | 11/2002 | Li | G02B 27/283 | 348/E9.027 |
| 6,571,033 B2 * | 5/2003 | Caracci | G02B 6/29362 | 385/24 |
| 6,577,779 B2 * | 6/2003 | Watanabe | G02B 6/2746 | 359/280 |
| 6,654,178 B1 * | 11/2003 | Lee | G02B 27/144 | 359/629 |
| 6,922,294 B2 * | 7/2005 | Pierson | G02B 6/43 | 359/812 |
| 6,928,210 B2 * | 8/2005 | Kropp | G02B 6/4215 | 385/16 |
| 6,985,647 B2 * | 1/2006 | Takamori | G02B 6/423 | 385/14 |
| 7,039,278 B1 * | 5/2006 | Huang | G02B 6/2746 | 359/484.05 |
| 7,065,269 B2 * | 6/2006 | Higuchi | G02B 6/12007 | 385/19 |
| 7,116,479 B1 * | 10/2006 | Jacobson | G02B 6/272 | 359/485.02 |
| 7,145,727 B2 * | 12/2006 | Hsieh | G02B 27/145 | 359/618 |
| 7,215,885 B2 * | 5/2007 | Yamane | G02B 6/29362 | 385/31 |
| 7,289,737 B2 * | 10/2007 | Ohmuro | H04B 10/1125 | 398/128 |
| 7,529,029 B2 * | 5/2009 | Duncan | G02B 27/283 | 359/634 |
| 7,889,622 B2 * | 2/2011 | Wada | G11B 7/12 | 369/112.21 |
| 7,943,895 B2 * | 5/2011 | Nakasendo | G02B 5/26 | 156/154 |
| 8,036,533 B2 * | 10/2011 | Hosomi | G02B 6/4215 | 398/79 |
| 8,184,522 B2 * | 5/2012 | Wada | G11B 7/12 | 369/112.21 |
| 8,235,605 B2 * | 8/2012 | Kim | G02B 6/4246 | 359/629 |
| 8,388,240 B2 * | 3/2013 | Uno | G02B 6/2746 | 385/11 |
| 8,488,238 B2 * | 7/2013 | Stanley | G02B 21/16 | 359/368 |
| 8,705,975 B2 * | 4/2014 | Chen | G02B 6/4246 | 398/138 |
| 2002/0135841 A1 * | 9/2002 | Kole | G02B 6/4225 | 398/139 |
| 2004/0004769 A1 * | 1/2004 | Suzuki | G02B 27/1026 | 359/640 |
| 2004/0109166 A1 | 6/2004 | Tsai | | |
| 2004/0184811 A1 * | 9/2004 | Takamori | G02B 6/423 | 398/141 |
| 2005/0094685 A1 | 5/2005 | Colin | | |
| 2005/0117201 A1 * | 6/2005 | Yamane | G02B 6/29362 | 359/333 |
| 2005/0178945 A1 | 8/2005 | Oka et al. | | |
| 2007/0154218 A1 * | 7/2007 | Sommer | G02B 6/29365 | 398/85 |
| 2007/0206953 A1 * | 9/2007 | Lee | G02B 6/4246 | 398/135 |
| 2010/0264299 A1 * | 10/2010 | Nakasendo | G02B 5/26 | 250/226 |
| 2011/0032609 A1 * | 2/2011 | Stanley | G02B 21/16 | 359/388 |
| 2011/0249976 A1 * | 10/2011 | Osawa | G02B 27/283 | 398/135 |
| 2016/0085028 A1 * | 3/2016 | Zhou | G02B 6/4215 | 398/34 |

FOREIGN PATENT DOCUMENTS

| | | |
|---|---|---|
| CN | 101943772 A | 1/2011 |
| EP | 0428744 A1 | 5/1991 |
| EP | 0473071 A2 | 8/1991 |
| JP | S57130001 A | 8/1982 |
| JP | S6069614 A | 4/1985 |
| JP | H02307281 A | 12/1990 |
| JP | 2003045063 A | 2/2003 |
| JP | 3538987 B2 | 6/2004 |
| JP | 2004234818 A | 8/2004 |
| JP | 2005235276 A | 9/2005 |
| JP | 2006195301 A | 7/2006 |
| WO | 2007129375 A1 | 11/2007 |
| WO | 2008129539 A2 | 10/2008 |

* cited by examiner

US 9,678,277 B2

FILTER, METHOD FOR PRODUCING FILTER, AND LASER WAVELENGTH MONITORING APPARATUS

This application is a continuation of International Application No. PCT/CN2013/076273, filed on May 27, 2013, which is hereby incorporated by reference in its entirety.

TECHNICAL FIELD

The present invention relates to the field of optical fiber communications technologies, and in particular, to a filter, a method for producing a filter, and a laser wavelength monitoring apparatus.

BACKGROUND

With continuous growth of a user's requirement for bandwidth, a conventional copper wire broadband access system is increasingly confronted with a bandwidth bottleneck. At the same time, an optical fiber communications technology with a massive bandwidth capacity is increasingly mature, and an optical fiber access network becomes a strong competitor of a next-generation broadband access network. In particular, a PON (passive optical network) system is more competitive.

In the PON system, an optical module is used as a physical entity for implementing a transceiver system, and a function of the optical module is of great importance; a laser is used as a transmission apparatus of a communication lightwave, a function of the laser is a top priority. In many application scenarios of a PON field, a transmit wavelength of a laser device needs to be stable at a specific value, so as to ensure that technical specifications of physical transmission and an optical communication standard are met. Therefore, in many application scenarios, a laser in an optical module generally has a semiconductor cooler or a heating membrane used to adjust a wavelength, and a laser wavelength monitoring apparatus needs to be used to implement a feedback adjustment.

As shown in FIG. 1, a prior laser wavelength monitoring apparatus includes a collimation lens 1, a first focusing lens 2, an F-P etalon 3, two beam splitters 4a and 4b, two optical receivers 5a and 5b, and two second focusing lenses 6a and 6b, where the F-P etalon 3 functions as a comb filter, and the two beam splitters 4a and 4b each are a beam splitter that has a fixed split ratio. Light emitted by a laser 7 becomes collimated light after passing through the collimation lens 1. The beam splitter 4a divides the collimated light according to a specific ratio, where one part of the light is received by the optical receiver 5a after passing through the second focusing lens 6a, and the other part of the light is incident into the F-P etalon 3 after passing through the beam splitter 4a. The beam splitter 4b divides, according to a specific ratio, light that penetrates the F-P etalon 3, where one part of the light is received by the optical receiver 5b after passing through the second focusing lens 6b, and the other part of the light passes through the beam splitter 4b, and then is incident into an incident port 8 of a transmit fiber after passing through the first focusing lens 2.

It is assumed that PD10 and PD20 are respectively initially calibrated optical powers of the two optical receivers 5a and 5b, PD1 and PD2 are respectively actual received optical powers of the two optical receivers 5a and 5b, and a ratio of the actual received optical power of the optical receiver 5b to that of the optical receiver 5a is A=PD2/PD1. When a redshift occurs in a laser wavelength, PD2=PD20+ΔP, and when a blueshift occurs in the laser wavelength, PD2=PD20−ΔP; PD1 does not vary with the laser wavelength. Therefore, a wavelength offset is:

$$\Delta A = +\Delta P/PD10 \text{ (redshift), and } \Delta A = -\Delta P/PD10 \text{ (blueshift)} \quad (1)$$

Therefore, a change status of a laser wavelength may be defined according to the wavelength offset ΔA.

The inventor of the present patent application finds that because of two beam splitters, an overall packaging size of a laser wavelength monitoring apparatus is relatively large, and packaging costs are relatively high, which does not accord with a current development tendency of miniaturization and low costs. In addition, monitoring precision of a laser wavelength monitoring apparatus of this structure is not high enough.

SUMMARY

Embodiments of the present invention provide a filter, a method for producing a filter, and a laser wavelength monitoring apparatus, so as to reduce a volume and costs of a laser wavelength monitoring apparatus and further improve monitoring precision.

According to a first aspect of the present invention, a filter is provided, including two translucent bodies, where each of the translucent bodies has a first plane, a second plane that forms a wedge angle with the first plane, and a third plane that intersects with both the first plane and the second plane, first planes of the two translucent bodies are parallel to each other, and second planes of the two translucent bodies are parallel to each other; a beam splitting film, where surfaces of both sides are respectively combined with the first planes of the two translucent bodies; and two reflective films, respectively combined with the second planes of the two translucent bodies.

In a possible implementation manner of the first aspect, the wedge angle is 45°±λ, and λ is a set allowable error.

In a possible implementation manner of the first aspect, third planes of the two translucent bodies are parallel or not parallel.

In a possible implementation manner of the first aspect, in the two translucent bodies, one of the translucent bodies includes at least two translucent substrates, where an anti-reflection coating is disposed between two adjacent translucent substrates.

According to a second aspect of the present invention, a method for producing the filter according to any one of the foregoing technical solutions is provided, including: plating a reflective film separately on second planes of two translucent bodies, and plating a beam splitting film on a first plane of one of the translucent bodies; and combining a first plane of the other translucent body with the beam splitting film.

In a possible implementation manner of the second aspect, the combining a first plane of the other translucent body with the beam splitting film is specifically bonding the first plane of the other translucent body to the beam splitting film.

According to a third aspect of the present invention, a laser wavelength monitoring apparatus is provided, including two optical receivers and the filter according to any one of the foregoing technical solutions, where the two reflective films of the filter respectively face a transmit port of a laser and an incident port of a transmit fiber, and the two third planes of the filter respectively face receive ports of the two optical receivers.

In a possible implementation manner of the third aspect, the laser wavelength monitoring apparatus further includes a collimation lens located between the transmit port of the laser and the reflective film that is of the filter and faces the transmit port of the laser.

In a possible implementation manner of the third aspect, one side of the collimation lens is a plane and is combined with the reflective film that is of the filter and faces the side of the collimation lens.

In a possible implementation manner of the third aspect, the laser wavelength monitoring apparatus further includes a first focusing lens located between the incident port of the transmit fiber and the reflective film that is of the filter and faces the incident port of the transmit fiber.

In a possible implementation manner of the third aspect, one side of the first focusing lens is a plane and is combined with the reflective film that is of the filter and faces the side of the first focusing lens.

In a possible implementation manner of the third aspect, the laser wavelength monitoring apparatus further includes two second focusing lenses, respectively located between the two third planes of the filter and the receive ports that are of the optical receivers and face the two third planes of the filter.

In a possible implementation manner of the third aspect, in the filter, a translucent body that includes at least two translucent substrates is located on one side that is of a beam splitting film and is close to the incident port of the transmit fiber.

In technical solutions of the embodiments of the present invention, a beam splitting film is disposed between first planes of two translucent bodies, so that a wavelength monitoring optical path of a laser wavelength monitoring apparatus is significantly shortened compared with that in the prior art, a volume of the laser wavelength monitoring apparatus is relatively small, and miniaturized packaging can be implemented, which significantly reduces packaging costs of a product. In addition, a laser wavelength monitoring apparatus that has a filter can perform transmittance power monitoring and reflected power monitoring, and monitoring precision of a wavelength offset is doubled. Therefore, the laser wavelength monitoring apparatus has higher monitoring precision compared with that in the prior art.

DETAILED DESCRIPTION OF ILLUSTRATIVE EMBODIMENTS

To reduce a volume and costs of a laser wavelength monitoring apparatus and further improve monitoring precision, embodiments of the present invention provide a filter, a method for producing a filter, and a laser wavelength monitoring apparatus. In technical solutions of the embodiments of the present invention, a beam splitting film is disposed between first planes of two translucent bodies, so that a wavelength monitoring optical path of a laser wavelength monitoring apparatus is significantly shortened compared with that in the prior art, a volume of the laser wavelength monitoring apparatus is relatively small, and miniaturized packaging can be implemented, which makes packaging costs relatively low. In addition, a laser wavelength monitoring apparatus that has a filter can perform transmittance power monitoring and reflected power monitoring, and monitoring precision of a wavelength offset is doubled. Therefore, the laser wavelength monitoring apparatus further has higher monitoring precision compared with that in the prior art. To make the objectives, technical solutions, and advantages of the present invention more comprehensible, the following further describes the present invention in detail by listing specific embodiments.

Figure 1:
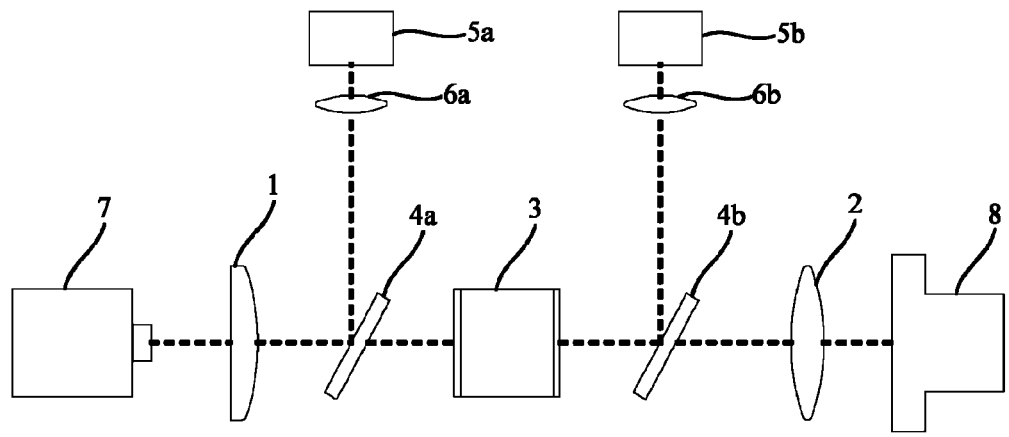
FIG. 1 is a schematic structural diagram of a prior laser wavelength monitoring apparatus.
Figure 2A:
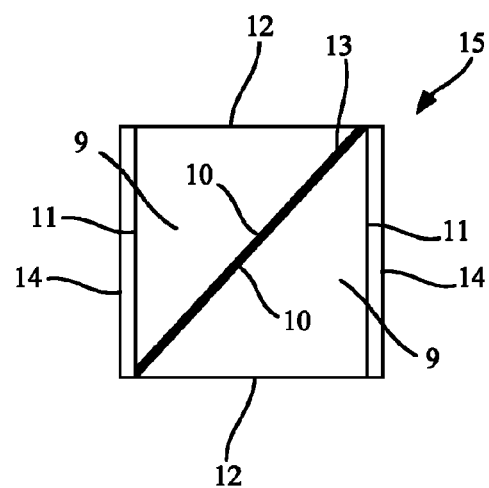
FIG. 2a is a schematic structural diagram of a first implementation manner of a filter according to a first embodiment of the present invention.

As shown in FIG. 2a, a filter in a first embodiment of the present invention includes two translucent bodies 9, where each of the translucent bodies 9 has a first plane 10, a second plane 11 that forms a wedge angle with the first plane 10, and a third plane 12 that intersects with both the first plane 10 and the second plane 11, first planes 10 of the two translucent bodies 9 are parallel to each other, and second planes 11 of the two translucent bodies 9 are parallel to each other.

The filter of FIG. 2a also includes a beam splitting film 13, where surfaces of both sides are respectively combined with the first planes 10 of the two translucent bodies 9. Two reflective films 14 are respectively combined with the second planes 11 of the two translucent bodies 9.

Figure 2B:
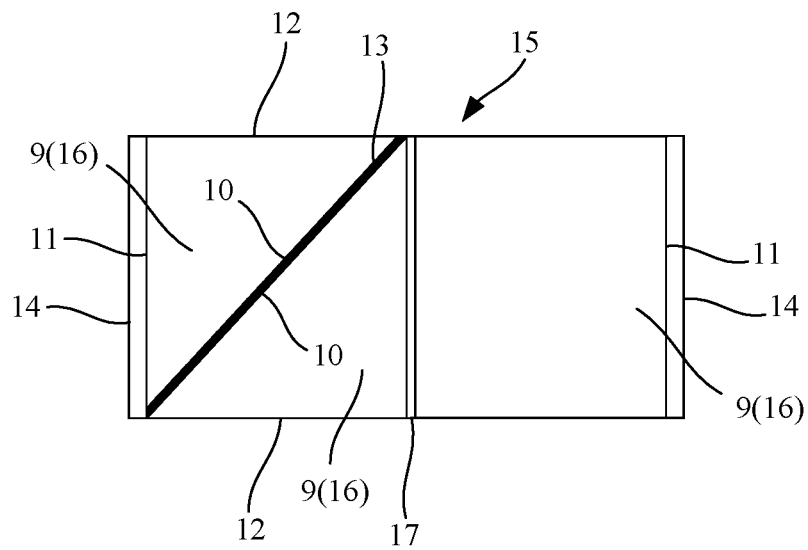
FIG. 2b is a schematic structural diagram of a second implementation manner of the filter according to the first embodiment of the present invention.

The translucent body 9 may include only one translucent substrate, or may include two or more translucent substrates. In the embodiment shown in FIG. 2b, in the two translucent bodies 9, one of the translucent bodies 9 includes at least two translucent substrates 16, where an antireflection coating 17 is disposed between two adjacent translucent substrates 16. By disposing the antireflection coating 17, a light loss can be reduced. A material of the translucent substrate 16 is not limited, and a material such as glass may be selected and used; a cross-section shape of the translucent substrate may be a triangle, a trapezoid, or the like.

To use a parallel interference resonance mode (including but not limited to F-P interference and G-T interference) to implement a filtering function, the first planes 10 of the two translucent bodies 9 are parallel to each other, and the second planes 11 of the two translucent bodies 9 are parallel to each other. The beam splitting film 13 has a fixed split ratio, and can divide an incident laser light by ratio, where one part is reflected, and the other part penetrates. The beam splitting film 13 may be first plated on a first plane 10 of one of the translucent bodies 9, and a first plane 10 of the other translucent body 9 is then bonded to the beam splitting film 13, so as to ensure that stable parallel interference resonance can be formed in the filter. The reflective film 14 generally includes multiple film layers in different thicknesses that are alternately distributed. These film layers may be silicon dioxide film layers, tantalum dioxide film layers, or the like. Design of a specific structure of these film layers is the prior art, and details are not described herein again.

A specific value of the wedge angle is not limited. In a filter in a second embodiment of the present invention, a wedge angle is 45°±λ, where λ is a set allowable error, for example, 1°. By selecting and using a wedge angle in this value range, design of an optical path of the filter can be relatively simple and convenient, which facilitates a layout of internal mechanical parts of a laser wavelength monitoring apparatus.

In a filter in a third embodiment of the present invention, the third planes 12 of the two translucent bodies 9 are not parallel. In a filter in a fourth embodiment of the present invention, the third planes 12 of the two translucent bodies 9 are parallel. By disposing the third planes 12 of the two translucent bodies 9 in parallel, two optical receivers of the laser wavelength monitoring apparatus can be disposed at symmetrical positions, which further facilitates design of an optical path and compactness and miniaturization of a product, and further reduces packaging costs of the product.

Figure 3:
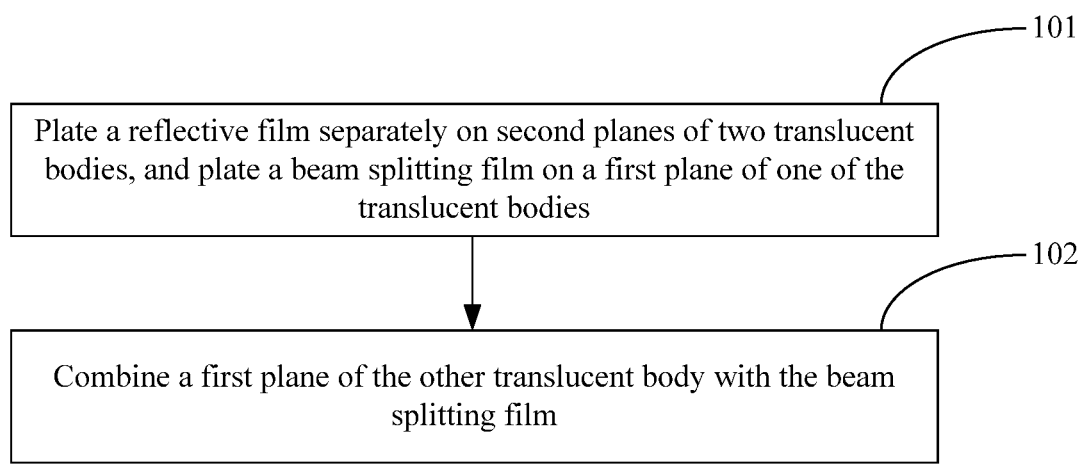
FIG. 3 is a schematic flowchart of a method for producing a filter according to a fifth embodiment of the present invention.
Figure 4:
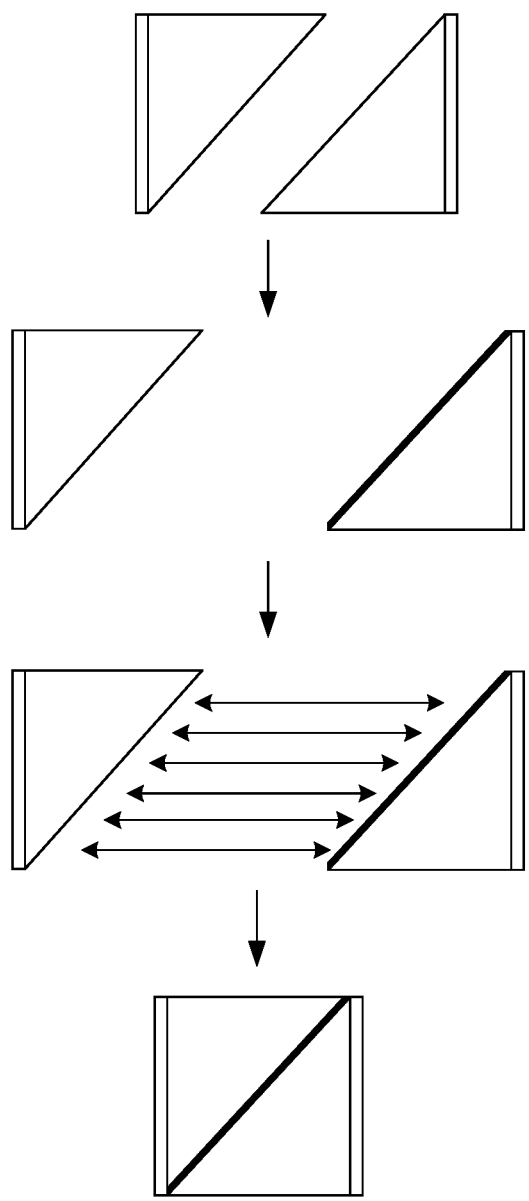
FIG. 4 is a schematic diagram of a process of producing a filter according to an embodiment of the present invention.

As shown in FIG. 3 and FIG. 4, a method for producing a filter in a fifth embodiment of the present invention includes the following steps.

Step 101: Plate a reflective film separately on second planes of two translucent bodies, and plate a beam splitting film on a first plane of one of the translucent bodies.

Step 102: Combine a first plane of the other translucent body with the beam splitting film.

In a method for producing a filter in a sixth embodiment of the present invention, step 102 is specifically combining the first plane of the other translucent body with the beam splitting film by using a bonding technology. An optical cement bonding technology is preferably used. Optical cement bonding is closely pasting together two homogeneous or heterogeneous materials after performing a series of surface processing, to form optical cement at a room temperature, and then, performing thermal treatment on the optical cement, to form permanent bonding in a case in which another binder and high pressure are not required. In an aspect of laser application, the technology not only can significantly improve thermal performance and beam quality that are of a laser, but also facilitates integration of a laser system.

Figure 5:
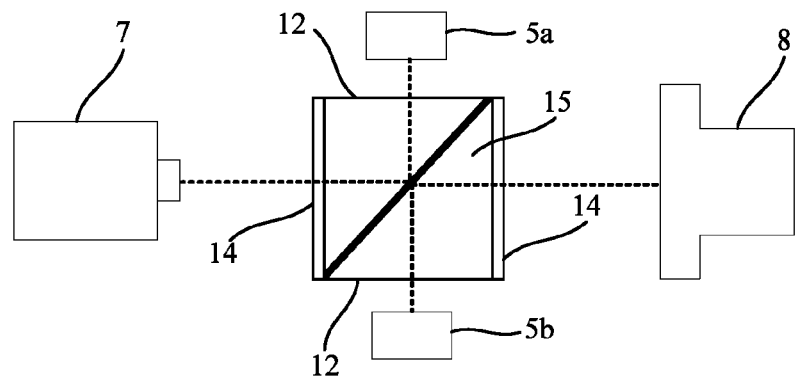
FIG. 5 is a schematic structural diagram of a laser wavelength monitoring apparatus according to a seventh embodiment of the present invention.

As shown in FIG. 5, a laser wavelength monitoring apparatus in a seventh embodiment of the present invention includes two optical receivers 5a and 5b and the filter 15 according to any one of the foregoing embodiments.

Two reflective films 14 of the filter 15 respectively face a transmit port of a laser 7 and an incident port 8 of a transmit fiber, and two third planes 12 of the filter 15 respectively face receive ports of the two optical receivers 5a and 5b.

The optical receivers 5a and 5b may use photodiodes to detect power of a received laser light.

Figure 6:
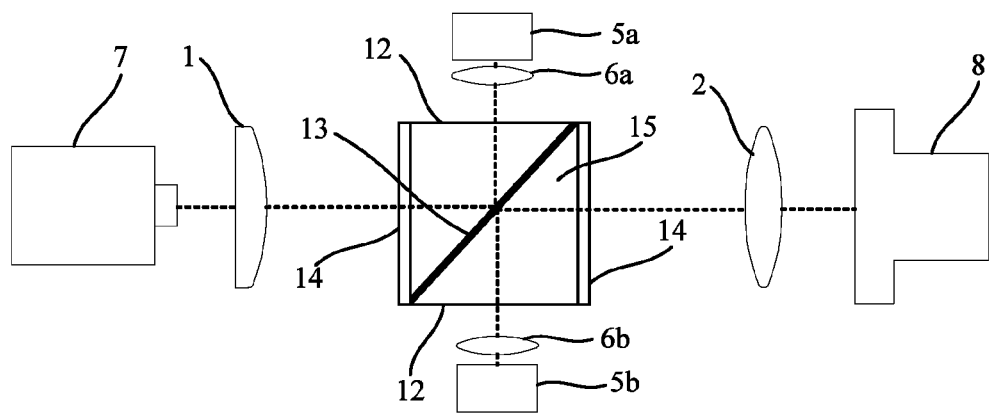
FIG. 6 is a schematic structural diagram of a laser wavelength monitoring apparatus according to an eighth embodiment of the present invention.

Referring to an eighth preferable embodiment shown in FIG. 6, the laser wavelength monitoring apparatus further includes a collimation lens 1 located between a transmit port of a laser 7 and a reflective film 14 that is of a filter 15 and faces the transmit port of the laser 7, and a first focusing lens 2 located between an incident port 8 of a transmit fiber and a reflective film 14 that is of the filter 15 and faces the incident port 8 of the transmit fiber. The collimation lens 1 and the first focusing lens 2 may also be respectively designed in structures of the laser 7 and the incident port 8 of the transmit fiber. However, in this case, sizes of the laser 7 and the incident port 8 of the transmit fiber are relatively large, structures of the laser 7 and the incident port 8 of the transmit fiber are slightly complex, and it is also inconvenient to adjust positions of the collimation lens 1 and the first focusing lens 2.

Further referring to the preferable embodiment shown in FIG. 6, the laser wavelength monitoring apparatus further includes two second focusing lenses 6a and 6b, respectively located between two third planes 12 of the filter 15 and the receive ports that are of the optical receivers 5a and 5b and face the two third planes 12 of the filter 15. Similarly and alternatively, the second focusing lenses 6a and 6b may be respectively designed in structures of the optical receivers 5a and 5b. It should be noted that when areas of receiving surfaces of the optical receivers 5a and 5b meet a specific condition, disposing of the second focusing lenses 6a and 6b may be omitted.

Figure 7:
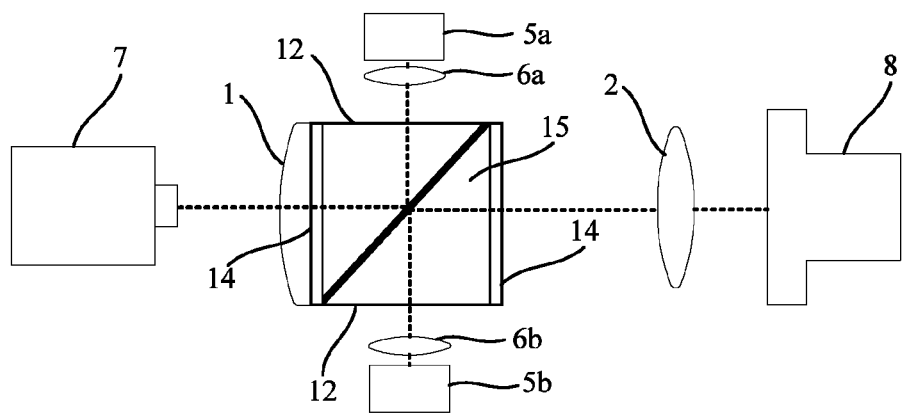
FIG. 7 is a schematic structural diagram of a laser wavelength monitoring apparatus according to a ninth embodiment of the present invention.

As shown in FIG. 7, in a laser wavelength monitoring apparatus in a ninth embodiment of the present invention, one side of a collimation lens 1 is a plane and is combined with a reflective film 14 that is of a filter 15 and faces the side of the collimation lens 1. In this case, the laser wavelength monitoring apparatus has a relatively small packaging size, and the position of a first focusing lens 2 may be adjusted freely.

Figure 8:
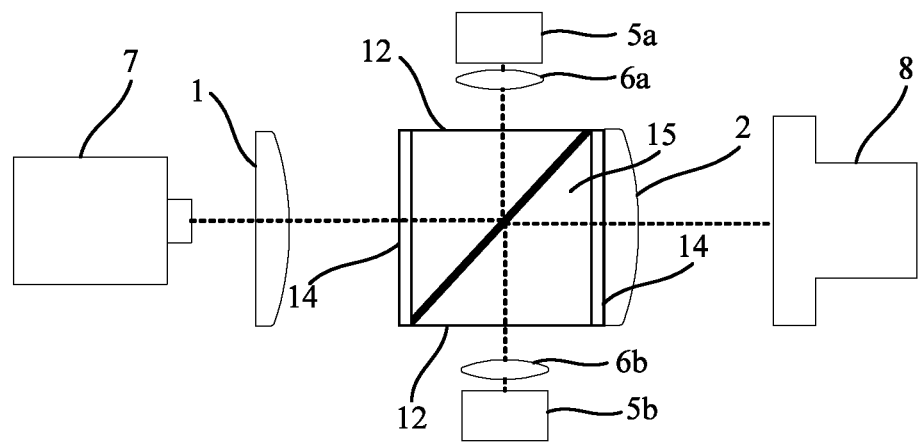
FIG. 8 is a schematic structural diagram of a laser wavelength monitoring apparatus according to a tenth embodiment of the present invention.

As shown in FIG. 8, in a laser wavelength monitoring apparatus in a tenth embodiment of the present invention, one side of a first focusing lens 2 is a plane and is combined with a reflective film 14 that is of a filter 15 and faces the side of the first focusing lens 2. In this case, the laser wavelength monitoring apparatus has a relatively small packaging size, and the position of the collimation lens may be adjusted freely.

Figure 9:
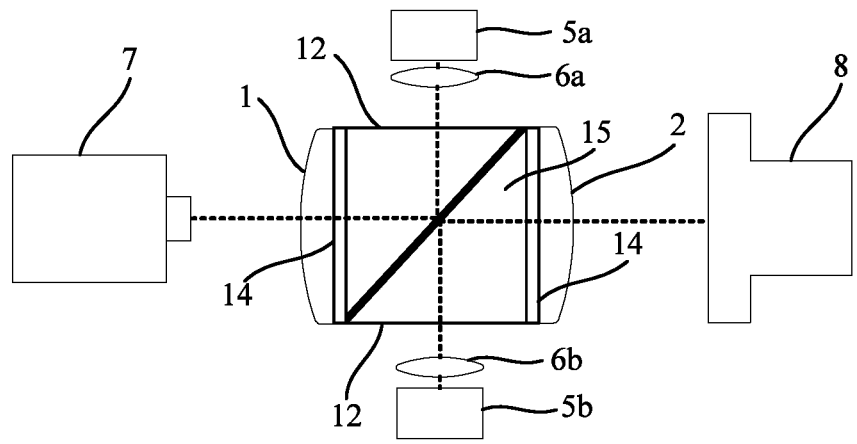
FIG. 9 is a schematic structural diagram of a laser wavelength monitoring apparatus according to an eleventh embodiment of the present invention.

As shown in FIG. 9, in a laser wavelength monitoring apparatus in an eleventh embodiment of the present invention, one side of a collimation lens 1 is a plane and is combined with a reflective film 14 that is of a filter 15 and faces the side of the collimation lens 1, and one side of a first focusing lens 2 is a plane and is combined with a reflective film 14 of the filter 15. In this case, a packaging size of the laser wavelength monitoring apparatus is the smallest compared with packaging sizes of the laser wavelength monitoring apparatuses in the ninth and the tenth embodiments, and positions of the collimation lens and the first focusing lens cannot be adjusted freely.

In the filter 15, when one of the translucent bodies 9 includes at least two translucent substrates 16, to reduce a loss of incident light, the translucent body 9 that includes at least two translucent substrates 16 are preferably designed on one side that is of a beam splitting film 13 and is close to an incident port 8 of a transmit fiber.

The embodiment shown in FIG. 6 is used as an example. A working principle of the laser wavelength monitoring apparatus is as follows: A laser light transmitted by a laser 7 becomes collimated light after passing through the collimation lens 1; the collimated light is incident into the reflective film 14 on one side of the filter 15, and the beam splitting film 13 divides a received laser light by ratio, where one part is reflected and emitted from the filter 15 to the first optical receiver 5a; the other part penetrates to the reflective film 14 on the other side of the filter 15, then, a part is reflected back to the beam splitting film 13, and the beam splitting film 13 divides a received laser light by ratio again, where a part is reflected and emitted from the filter to the second optical receiver 5b.

A beam splitting film is disposed between first planes of two translucent bodies, so that a wavelength monitoring optical path of a laser wavelength monitoring apparatus is significantly shortened compared with that in the prior art, a volume of the laser wavelength monitoring apparatus is relatively small, and miniaturized packaging can be implemented, which significantly reduces packaging costs of a product. For example, a wavelength monitoring apparatus in the prior art generally uses XMD packaging, and packaging costs are relatively high. However, a wavelength monitoring apparatus in the solutions may use TO packaging, which significantly reduces packaging costs.

It is assumed that PD1 and PD2 are respectively actual received optical powers of two optical receivers 5a and 5b, an overall reflected optical power of a filter 15 is Pf, and an overall transmittance optical power of the filter 15 is Pt. When a redshift occurs in a laser wavelength, the overall transmittance optical power of the filter 15 is Pt+ΔP, and when a blueshift occurs in the laser wavelength, the overall reflected optical power of the filter 15 is Pf−ΔP; PD1 does not vary with the laser wavelength. Therefore, a wavelength offset is:

$$\Delta A = +2\Delta P/(Pf+Pt) \text{ (redshift), and } \Delta A = -2\Delta P/(Pf+Pt) \text{ (blueshift)} \quad (2)$$

For a filter as a whole, Pf+Pt=P0, where P0 is a constant value, and does not vary with a laser wavelength. Therefore, a change status of a laser wavelength may also be defined according to the wavelength offset ΔA.

By comparing formula (2) with formula (1) in the prior art, it can be seen that the laser wavelength monitoring apparatus can perform transmittance power monitoring and reflected power monitoring, and monitoring precision of a wavelength offset is doubled. Therefore, compared with a laser wavelength monitoring apparatus in the prior art, the laser wavelength monitoring apparatus has higher monitoring precision and higher monitoring performance.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An apparatus, comprising:
   a first optical receiver;
   a second optical receiver; and
   a filter comprising:
      first and second translucent bodies, wherein each of the first and second translucent bodies has a first plane, a second plane that forms a wedge angle with the first plane, and a third plane that intersects with both the first plane and the second plane, the first planes of the first and second translucent bodies are parallel to each other, and the second planes of the first and second translucent bodies are parallel to each other;
      a beam splitting film, wherein a first surface of the beam splitting film is combined with the first plane of the first translucent body and an opposite second surface of the beam splitting film is combined with the first plane of the second translucent body; and
      first and second reflective films, wherein the first reflective film is combined with the second plane of the first translucent body and the second reflective film is combined with the second plane of the second translucent body;
   wherein the first reflective film of the filter faces a transmit port of a laser and the second reflective film of the filter faces a pipe orifice of an incident port of a transmit fiber; and
   wherein a third plane of the first translucent body faces a port of the first optical receiver and the third plane of the second translucent body faces a port of the second optical receiver.

2. The apparatus according to claim 1, wherein the apparatus further comprises a laser wavelength monitoring apparatus.

3. The apparatus according to claim 1, further comprising a collimation lens located between the transmit port of the laser and the first reflective film of the filter.

4. The apparatus according to claim 3, wherein one side of the collimation lens is a plane and is combined with the first reflective film of the filter.

5. The apparatus according to claim 1, further comprising a first focusing lens located between the pipe orifice and the second reflective film of the filter.

6. The apparatus according to claim 5, wherein one side of the first focusing lens is a plane and is combined with second reflective film of the filter.

7. The apparatus according to claim 1, further comprising:
   a first focusing lens located between the third plane of the first translucent body and a receive port of the first optical receiver; and
   a second focusing lens located between the third plane of the second translucent body and a receive port of the second optical receiver.

8. The apparatus according to claim 7, wherein the receive ports of the first and second optical receivers face the third planes of the first and second translucent bodies.

9. The apparatus according to claim 1, wherein in the filter, a translucent body that comprises a plurality of translucent substrates is located on one side that is of a beam splitting film and is close to the incident port of the transmit fiber.

10. A method, comprising:
   providing a first optical receiver;
   providing a second optical receiver; and
   forming a filter, comprising:
      plating a first reflective film on a second plane of a first translucent body, wherein the first reflective film is combined with the second plane of the first translucent body;
      plating a second reflective film on a second plane of a second translucent body, wherein the second reflective film is combined with the second plane of the second translucent body;
      plating a beam splitting film on a first plane of the first translucent body;
      combining a first surface of the beam splitting film with the first plane of the first translucent body and an opposite second surface of the beam splitting film with the first plane of the second translucent body;
   wherein second translucent body has a first plane;
   wherein each of the first translucent body and the second translucent body has a second plane that forms a wedge angle with the first plane, and a third plane that intersects with both the first plane and the second plane, the first planes of the first and second translucent bodies are parallel to each other, and the second planes of the first and second translucent bodies are parallel to each other;

wherein the first reflective film of the filter faces a transmit port of a laser and the second reflective film of the filter faces a pipe orifice of an incident port of a transmit fiber; and wherein a third plane of the first translucent body faces a port of the first optical receiver and the third plane of the second translucent body faces a port of the second optical receiver.

* * * * *